United States Patent
Vivanco (10) Patent No.: US 9,603,146 B1
(45) Date of Patent: Mar. 21, 2017

(54) DYNAMIC MANAGEMENT OF DATA BUFFERING FOR WIRELESS COMMUNICATION

(71) Applicant: Sprint Spectrum L.P., Overland Park, KS (US)

(72) Inventor: Daniel Vivanco, Sterling, VA (US)

(73) Assignee: Sprint Spectrum L.P., Overland Park, KS (US)

( * ) Notice: Subject to any disclaimer, the term of this patent is extended or adjusted under 35 U.S.C. 154(b) by 46 days.

(21) Appl. No.: 14/727,204

(22) Filed: Jun. 1, 2015

(51) Int. Cl.
    *H04B 7/216* (2006.01)
    *H04W 72/04* (2009.01)
    *H04W 28/02* (2009.01)

(52) U.S. Cl.
    CPC ... *H04W 72/0453* (2013.01); *H04W 28/0205* (2013.01); *H04W 28/0278* (2013.01)

(58) Field of Classification Search
    None
    See application file for complete search history.

(56) References Cited

U.S. PATENT DOCUMENTS

| | | | |
|---|---|---|---|
| 2001/0021197 A1* | 9/2001 | Foore | H04J 3/1682 370/468 |
| 2001/0040872 A1* | 11/2001 | Haglund | H04L 47/10 370/235 |
| 2004/0179497 A1* | 9/2004 | Foore | H04J 3/1682 370/335 |

* cited by examiner

*Primary Examiner* — Kouroush Mohebbi (57) ABSTRACT

Disclosed is a method and system to help manage data buffering, which may in turn help manage air interface resources. In accordance with the disclosure, when a base station detects transmitting data transmission to a WCD at a rate exceeding a defined rate cap, the base station may then predict how long it will be before a data buffer that would hold excess data for transmission to the WCD would reach a threshold fill level where the base station would increase air interface resources used for transmission to the WCD. The base station may then determine, based at least on that predicted duration, whether and/or to what extent to the increase the threshold fill level of the buffer, to help defer the buffer from reaching the threshold fill level, and thus to help defer increasing of air interface resources used for transmission to the WCD.

19 Claims, 4 Drawing Sheets

DYNAMIC MANAGEMENT OF DATA BUFFERING FOR WIRELESS COMMUNICATION

BACKGROUND

Unless otherwise indicated herein, the description provided in this section is not itself prior art to the claims is not admitted to be prior art by inclusion in this section.

In a wireless communication system, a base station provides one or more coverage areas, such as cells or sectors, in which the base station may serve wireless communication devices (WCDs), such as cell phones, wirelessly-equipped personal computers or tablets, tracking devices, embedded wireless communication modules, or other devices equipped with wireless communication functionality. Further, the base station may be in communication with network infrastructure including a gateway system that provides connectivity with a transport network such as the Internet for instance. With this arrangement, a WCD within coverage of the base station may engage in air interface communication with the base station and may thereby communicate via the base station and gateway system with various other entities.

In general, a base station may provide service in accordance with a particular air interface protocol or radio access technology, examples of which include Orthogonal Frequency Division Multiple Access (OFDMA (e.g., Long Term Evolution (LTE) or Wireless Interoperability for Microwave Access (WiMAX)), Code Division Multiple Access (CDMA) (e.g., 1×RTT and 1×EV-DO), and Global System for Mobile Communications (GSM), IEEE 802.11 (WiFi), and others now known or later developed.

In accordance with the air interface protocol, each coverage area provided by the base station may operate on one or more radio frequency carriers, each defining one or more ranges of frequency spectrum and having a respective downlink channel for carrying communications from the base station to WCDs and a respective uplink channel for carrying communications from the WCDs to the base station. Such carriers may be frequency division duplex (FDD), in which the downlink and uplink channels are defined as separate respective ranges of frequency, or time division duplex (TDD), in which the downlink and uplink channels are defined on a common range of frequency but distinguished through time division multiplexing. Further, the downlink and uplink channels may then define various sub-channels for carrying particular communications, such a control signaling and data (e.g., user communications or other application layer data) between the base station and served WCDs.

As WCDs enter into coverage of the base station, the base station may become configured with connections to serve those WCDs. For instance, for each such WCD entering coverage on a particular carrier, the base station may engage in signaling with the network infrastructure to establish a bearer connection for carrying data between the gateway system and the base station, and the base station may work with the WCD to establish a radio-link-layer connection for carrying data over the air between the base station and the WCD on the carrier.

Once so configured, the base station may then serve the WCDs. For instance, when data arrives over the transport network for transmission to a WCD, the gateway system may transmit the data over the WCD's bearer connection to the base station, and the base station may then transmit the data over the WCD's radio-link-layer connection to the WCD.

Overview

In any such wireless communication system, each carrier on which a base station provides service will have a limited supply of resources on which to transmit data to served WCDs. For instance, each carrier will have a limited frequency bandwidth. Further, depending on the air interface protocol, only certain portions of a carrier's frequency bandwidth and/or certain segments of time may be designated for use to carry data to served WCDs. Other resource limitations may be possible as well.

In order to help fairly manage data transmission resources given this limitation, the base station may be configured to impose a per-WCD data transmission rate cap when air interface resources in high use. In particular, the base station may be configured to detect when data-transmission resources on a carrier are in threshold high use (e.g., when a threshold high percentage of such resources are in use) and to responsively begin applying a per-WCD rate cap for data transmissions on that carrier, possibly depending on WCD service level, communication type, and/or other factors.

When applying such a rate cap on the carrier, as the base station receives data for transmission to a WCD on the carrier, the base station may limit its rate of transmission of that data to be no greater than the rate cap and may buffer any excess data (i.e., data at greater than the rate cap) destined to the WCD. For this purpose, the base station may establish and maintain in physical data storage a respective data buffer for each such WCD, with each such data buffer being statically or dynamically sized.

Ideally, when the base station is buffering excess data for transmission to a WCD, the rate at which the base station accumulates excess data for transmission to the WCD will vary over time, so that the extent of data that the base station has buffered for transmission the WCD will not grow out of control. However, this may not always be the case. Therefore, to help manage data storage resources, the base station may also be configured to apply a buffer-fullness threshold, defining a maximum or near maximum quantity of excess data that the base station will buffer per WCD, and the base station may be configured to take action when the extent of data in the WCD's buffer reaches that threshold level. In particular, the base station may be configured to detect when a WCD's buffer reaches the threshold fill level and to responsively allocate additional air interface capacity, such as one or more additional carriers, to the WCD, to help facilitate a greater rate of data transmission to the WCD.

Unfortunately, however, having a base station allocate additional air interface resources to a WCD in response to the base station having a threshold extent of excess data buffered for transmission to the WCD may itself lead to a further problem. Namely, doing so may essentially propagate the air interface load issue to the newly added air interface resources. For instance, if a WCD is engaged in extensive data communication on a given carrier and the base station detects that the WCD's buffer is threshold full and responsively allocates an additional carrier to the WCD, the WCD's extensive data communication will then contribute to load on the additional carrier as well, and that load could create user experience issues. Further, this problem may be magnified if multiple WCDs are engaged in extensive data communication on the same carrier. Therefore, an improvement is desired.

Disclosed herein is a method and system to help better manage data buffering, which may in turn help better manage air interface resources. In accordance with the disclosure, when a base station detects data transmission to a WCD at a rate exceeding a defined rate cap, the base station may then predict how long it will be before a data buffer that would hold excess data for transmission to the WCD would reach a threshold fill level where the base station would increase air interface resources used for transmission to the WCD. In turn, the base station may then determine, based at least on that predicted duration, whether and/or to what extent to the increase the threshold fill level of the buffer, to help defer the buffer from reaching the threshold fill level, and thus to help defer increasing of air interface resources used for transmission to the WCD. And before the buffer reaches that threshold fill level, the base station may then increase the threshold fill level of the buffer accordingly.

Accordingly, in one respect, disclosed is a method of managing data buffering in a wireless communication system that includes a base station. In accordance with the disclosure, the method involves detecting transmission of data to a served WCD at a rate exceeding a defined rate cap. And the method then involves, in response detecting transmission of data to the served WCD at the rate exceeding the defined rate cap, predicting a duration T of how long it will be before a data buffer for holding excess data for transmission to the WCD will reach a threshold fill level. Further, the method involves, based at least on that predicted duration T, increasing the threshold fill level to help defer the buffer reaching the threshold fill level.

In addition, disclosed is another method of managing data buffering in a wireless communication system that includes a base station. In accordance with the disclosure, the method involves a base station serving a WCD over a radio-link-layer connection between the base station and the WCD, where the radio-link-layer connection has a capacity. Further, the method involves, while so serving the WCD, the base station detecting a threshold high rate of data transmission to the WCD, where the base station is configured to buffer, in a data buffer, excess data for transmission to the WCD upon the reaching the threshold high rate of data transmission to the WCD, where the data buffer has a fullness threshold, and where the base station is configured to increase the capacity of the radio-link-layer connection upon the data buffer reaching the fullness threshold. In turn, the method involves, upon detecting the threshold high rate of data transmission to the WCD, the base station predicting a duration T of how long before the buffer-fullness threshold will be reached. And the method involves, based at least in part on the predicted duration T, the base station increasing the buffer-fullness threshold, to thereby help defer possible increasing of capacity of the radio-link-layer connection.

Still further, disclosed is a base station configured to manage data buffering. In accordance with the disclosure, the base station includes a wireless communication interface for communicating over an air interface with a served WCD. Further, the base station includes a processing unit, data storage, and program instructions stored in the data storage and executable by the processing unit to carry out various operations such as those noted above. For instance, the operations may include detecting that a rate of data transmission to the WCD exceeds a defined rate cap. Further, the operations may include, in response to detecting that the rate of data transmission to the WCD exceeds the defined rate cap, (i) predicting a duration T of how long it will be before a data buffer for holding excess data for transmission to the WCD will reach a threshold fill level at which the base station would increase air interface resources used for serving the WCD, and (ii) based at least on the predicted duration T, increasing the threshold fill level to help defer the buffer reaching the threshold fill level and thus to help defer increasing air interface resources used for serving the WCD.

These as well as other aspects, advantages, and alternatives will become apparent to those of ordinary skill in the art by reading the following detailed description, with reference where appropriate to the accompanying drawings. Further, it should be understood that the descriptions provided in this overview and below are intended to illustrate the invention by way of example only and not by way of limitation.

DETAILED DESCRIPTION

The present method and apparatus will be described herein in the context of LTE. However, it will be understood that principles of the disclosure can extend to apply in other scenarios as well, such as with respect to other air interface protocols. Further, even within the context of LTE, numerous variations from the details disclosed herein may be possible. For instance, elements, arrangements, and functions may be added, removed, combined, distributed, or otherwise modified. In addition, it will be understood that operations described here as being performed by one or more entities may be implemented in various ways, such as by a processor executing software instructions for instance.

Figure 1:
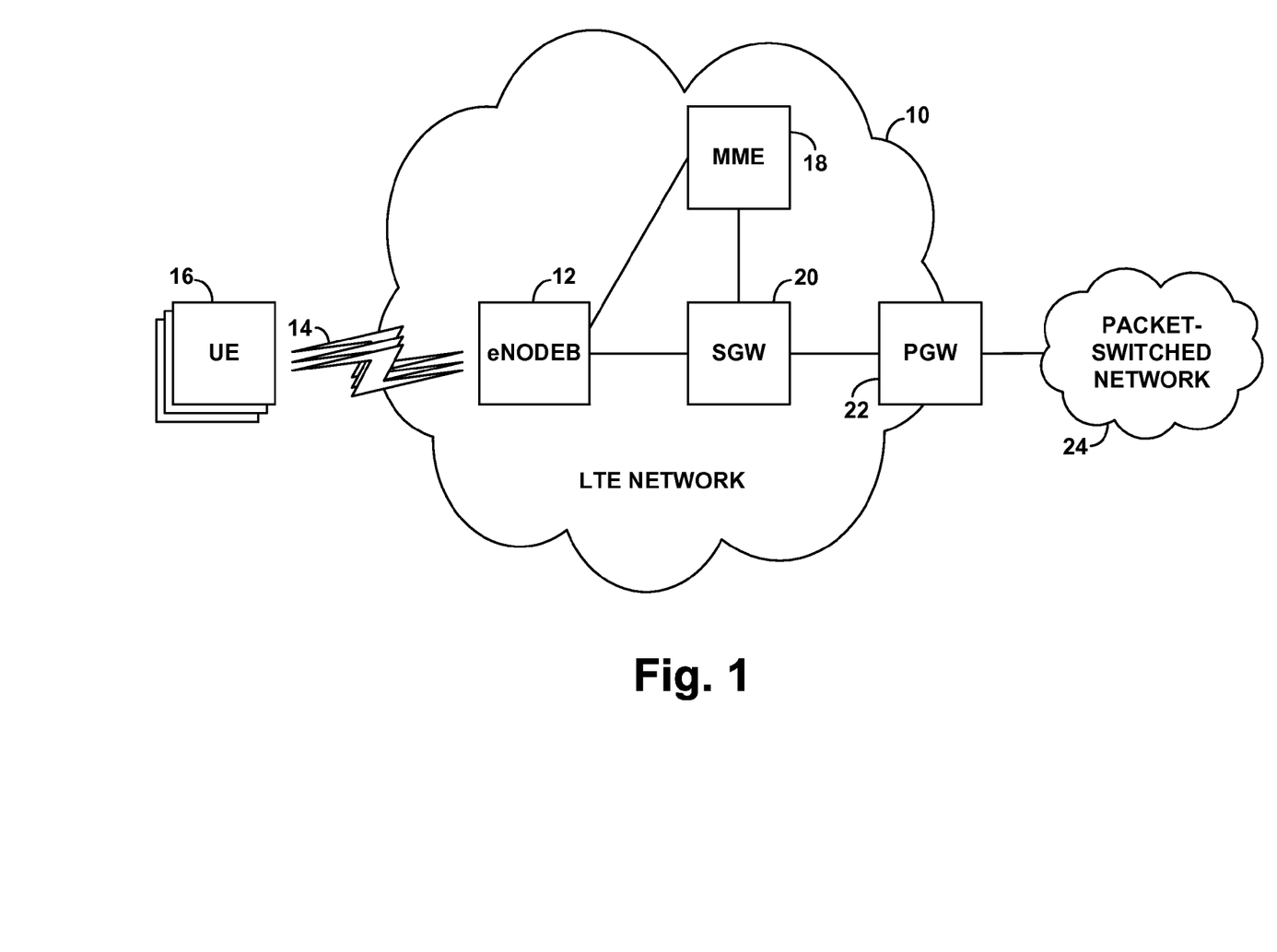
FIG. 1 is a simplified block diagram of a wireless communication system in which the present method and system can be implemented.

Referring to the drawings, as noted above, FIG. 1 is a simplified block diagram of a wireless communication system in which the present method and system can be implemented. In particular, FIG. 1 depicts a representative LTE network 10, which functions primarily to serve WCDs with wireless packet data communication service, including possibly voice-over-packet service, but may also provide other functions. As shown, the LTE network includes a base station (eNodeB) 12, which has an antenna structure and associated equipment for providing an LTE coverage area in which to serve WCDs such as example WCDs 16 as shown. The eNodeB 12 then has a communication interface with a mobility management entity (MME) 18 that functions as a signaling controller for the LTE network. Further, the eNodeB 12 has a communication interface with a serving gateway (SGW) 20, which in turn has a communication interface with a packet-data network gateway (PGW) 22 that provides connectivity with a packet-switched network 24, and the MME has a communication interface with the SGW 20. In practice, the illustrated components of the LTE network may sit as nodes on a private packet-switched network owned by an operator of the LTE network, and thus the various communication interfaces may be logical interfaces through that network.

As illustrated, eNodeB 12 is configured (e.g., licensed and equipped) to provide service on various LTE carriers 14, each of which could be FDD or TDD, and each of which has a particular downlink frequency bandwidth. For instance, each of the carriers could have a downlink bandwidth such as 1.4 MHz, 3 MHz, 5 MHz, 15 MHz, or 20 MHz. In practice, each of these carriers (and/or, if FDD, its particular downlink and uplink frequency channels) may be identified by a globally unique identifier per industry standard, so that the eNodeB and a served WCD can refer to particular carriers by those identifiers.

According to LTE, the air interface defines over time a continuum of 10-millisecond frames, each divided into ten 1-millisecond subframes defining two 0.5-millisecond slots, and each subframe is then divided into 14 symbol time segments (7 per slot). Further, an LTE carrier's frequency bandwidth defines a sequence of 15-kHz subcarriers, which are divided into groups of 12 subcarriers to define within each slot a number of physical resource blocks (PRBs). In particular, each PRB thus spans 12 subcarriers and 7 symbol time segments, thus defining an array of resource elements, each 1 subcarrier by one symbol time segment, in which data can be modulated for transmission. On an FDD carrier, all of the subframes per frame are used for both downlink and uplink communication. Whereas, on a TDD carrier, certain subframes per frame are used for downlink communication, and other subframes per frame are used for uplink communication.

Further, the LTE downlink defines certain channels in this air interface structure. In particular, the first one to three symbol time segments per downlink subframe may be reserved to define control channels such as a physical downlink control channel (PDCCH) for carrying scheduling directives and other control signaling. Further, the remaining symbol segments may be reserved to define a physical downlink shared channel (PDSCH) for carrying data to served WCDs. Still further, certain resource elements throughout each subframe may be reserved to define a reference signal that WCDs can detect and measure to evaluate coverage strength. In addition, other aspects of the LTE downlink structure, including variations or exceptions to those noted here, may exist as well.

When a WCD, such as one of WCDs 16, enters into coverage of eNodeB 12, the WCD may detect the eNodeB's coverage on a particular carrier, and the WCD may then engage in an attach process or handover process to register with the LTE network on that carrier. For instance, the WCD may transmit to the eNodeB an attach request, which the eNodeB may pass along to the MME 18, triggering a process of authenticating the WCD, provisioning the eNodeB with a service profile record for the WCD, and establishing of one or more bearer connections for the WCD between the eNodeB and the PGW 22. In practice, different bearer connections could be established and designated for use to carry different types of data with different levels of service each having a respective quality of service indicator (QCI), such as a guaranteed bit rate bearer for carrying real-time media streams and other latency-sensitive traffic, and a best-efforts bearer for carrying non-real time data, for instance. (In addition, different QCIs could be used for bearer connections for different types of WCDs, such as to distinguish between "heavy" (excessive data) users and light users, home users and roaming users, and/or post-paid users and pre-paid users, for instance.) Further, the eNodeB and WCD may engage in radio resource control (RRC) signaling to establish for the WCD a radio-link-layer connection (RRC connection) on the carrier, with the eNodeB and WCD each storing a context record indicating that the eNodeB is serving the WCD on that carrier.

(If appropriate the eNodeB may arrange through RRC signaling to initially serve the WCD on multiple carriers at once, providing the WCD with "carrier aggregation" service. For simplicity, however, but without limitation, this disclosure will discuss the arrangement where the WCD starts out being served on just one carrier.)

Once the WCD is so attached with the eNodeB, the eNodeB may then serve the WCD. For instance, as the PGW 22 receives data destined to the WCD, that data may flow from the PGW 22 to the SGW 20 to the eNodeB on an applicable bearer connection, and the eNodeB may schedule air interface transmission of the data to the WCD and accordingly transmit the data to the WCD. In practice, for example, the eNodeB may apply a scheduler to select and allocate a number of PRBs in which to provide the transmission in a given subframe, and the eNodeB may transmit to the WCD on the PDCCH of that subframe a downlink control information (DCI) message specifying the allocated PRBs and modulate the data on the resource elements in the allocated PRBs. And the WCD may then receive the DCI, determine which PRBs carry the data, and demodulate to receive the transmitted data from the resource elements of those PRBs.

As noted above, the present disclosure addresses a data-buffering situation that may arise when resources on a carrier such as this are in threshold high use. This may occur when the eNodeB is serving just one WCD and the WCD is engaged in extensive communication, such as receiving data at a very high rate, and/or when the eNodeB is serving multiple WCDs on the carrier and all of the WCDs are receiving data concurrently, also possibly at a very high data rate. Given that the carrier has a finite extent of resources (e.g., PRBs) per unit time (e.g., per downlink subframe) on which to schedule data transmissions, if the eNodeB receives too much data per unit time, the eNodeB may need to buffer excess data for later transmission, such as for transmission in a subsequent subframe.

In practice, as noted above, the eNodeB may be arranged to monitor the level of resource use on the carrier and to determine when that resource use is threshold high, such as when a predefined percentage of the carrier resources are allocated per unit time (e.g., per frame, or on average over recent subframes). Further, upon detecting that the resource use on the carrier is threshold high, the eNodeB may be configured to begin imposing a per-WCD rate cap for data transmission on the carrier. In particular, the eNodeB may be configured to limit the rate of data transmission to a WCD on the carrier to be no greater than a predefined maximum data transmission rate. This rate cap could be the same for all WCDs or could be different per WCD, established based on factors such as the WCD's subscription service level or the QCI level of the bearer connection carrying the data.

As further noted above, the eNodeB may thus establish and maintain in data storage for each such WCD a respective data buffer, comprising static or dynamically sized storage for holding excess data destined to the WCD. For instance, the eNodeB may reserve storage space for this use upon attachment of the WCD, upon detecting the high level of carrier resource use generally, in response to detecting data transmission to the WCD at a rate that exceeds the applicable rate cap, or in response to other triggers. This data buffer may serve to hold excess data for transmission to the WCD, i.e., any data that the eNodeB has received for transmission to the WCD and has not yet transmitted to the WCD. For instance, when the eNodeB receives from the SGW data for transmission to the WCD, the eNodeB may store the data in such a buffer pending scheduling and transmission of transmission of the data over the air to the WCD.

In addition, the eNodeB may be arranged to detect a threshold high rate of data transmission to the WCD and to responsively buffer excess data for transmission to the WCD.

In practice, detecting the threshold high rate of transmission to the WCD can take various forms. For example, the eNodeB may monitor the rate at which the eNodeB receives from the SGW data being transmitted the WCD and may determine that that rate of receipt is higher than the applicable rate cap or, based on a trending increase in that rate over time, that the rate is about to be higher than the applicable rate cap. As another example, the eNodeB may monitor the rate at which the eNodeB is transmitting data to the WCD and may determine that that rate of transmission is higher than the applicable rate cap or, based on a trending increase in that rate over time, that the rate is about to be higher than the applicable rate cap. It may happen, for instance, that the eNodeB is transmitting to the WCD at a rate higher than the rate cap at a time when the eNodeB is not detecting threshold high carrier resource use and when the rate cap does not apply, and then, upon detecting the high carrier resource use and responsively starting to apply the rate cap, the eNodeB may then determine that the rate of transmission to the WCD exceeds the rate cap. Other examples may be possible as well.

In turn, the act of buffering excess data for transmission to the WCD may then comprise storing in the data buffer for the WCD (i.e., the WCD's data buffer) data that the eNodeB has for transmission to the WCD to the extent beyond the rate cap. For instance, if the eNodeB is receiving data for transmission to the WCD at a rate of N bits per second and the WCD's rate cap is M bits per second, where N>M, the eNodeB may store in the WCD's buffer a total of N-M bits per second, on a first-in first-out basis. Further, if the rate of the eNodeB's receipt of data for transmission to the WCD varies over time, the extent to which the eNodeB will buffer data for transmission to the WCD may thus vary as well.

As further noted above, to help manage data storage resources by avoiding uncontrollable growth in the amount of data that the eNodeB buffers for a WCD, the eNodeB may also apply a per-WCD buffer-fullness threshold. Like the rate cap discussed above, the buffer-fullness threshold by default could be the same for all WCDs or could vary per WCD based on the WCD's service profile and/or one or more other factors, possibly being specified by the WCD's service profile received by the eNodeB during WCD attachment. By way of example, the buffer-fullness threshold for a WCD's data buffer could be a specific measure of quantity of data, such as a number of bits or bytes (e.g., a number of megabits), as a maximum or near maximum quantity of data that the eNodeB would store in the WCD's data buffer. Alternatively, the buffer-fullness threshold could be a percentage or other measure of fullness of the WCD's data buffer, considering the quantity of data buffered versus the size of the data buffer. As a specific example, the buffer-fullness threshold could be a percentage value such as a value over 90 percent.

In practice, as noted above, the eNodeB may be arranged to detect when the extent of data stored in the WCD's data buffer reaches the buffer-fullness threshold, and to responsively take action to increase air interface resources that the eNodeB uses for serving the WCD. For instance, in the arrangement of FIG. 1, when the eNodeB is serving the WCD one of the carriers 14, the eNodeB may be arranged to detect that WCD's data buffer reaches the fullness threshold and to responsively add to the WCD's RRC connection an additional one of carriers 14 so as to begin serving the WCD with carrier aggregation service on the combination of those carriers. In particular, upon detecting the threshold fullness, the eNodeB may select an additional one of the carriers and send to the WCD an RRC connection reconfiguration message that specifies the two carriers on which the eNodeB will now serve the WCD, and the eNodeB and WCD may thus become configured accordingly. (In another arrangement, if the eNodeB is already serving the WCD on multiple carriers concurrently, this process may apply to add yet another carrier to the combination.)

As explained above, however, it may not always be so desirable to increase the air interface resources on which the eNodeB serves the WCD, as doing so may result in propagating load issues to the added air interface resources, which could in turn create user experience issues or other issues.

Per the present disclosure, the eNodeB may manage this situation by dynamically increasing the WCD's buffer-fullness threshold. In particular, when the eNodeB detects transmission to the WCD at a rate exceeding the rate cap, the eNodeB may then predict how long it will be before the WCD's data buffer reaches the threshold fullness level, and the eNodeB may then increate the WCD's buffer-fullness threshold based at least in part on that predicted duration.

As an example of this, without limitation, the eNodeB may predict a duration, T, of how long it will before the buffer-fullness threshold will be reached by taking into consideration a ratio of (i) the buffer-fullness threshold to (ii) a difference between the actual rate of data transmission to the WCD and the rate cap. Further, the eNodeB may also factor in an error factor to account for variation of the rate at which data will be transmitted to the WCD. Thus, in practice, the eNodeB may compute the duration $T=C/(\beta_t-\gamma)+\epsilon$, where C is the buffer-fullness threshold, $\beta_t$ is the actual rate of data transmission to the WCD, $\gamma$ is the data rate cap, and $\epsilon$ is an error factor. And based at least on that predicted duration T, the eNodeB may then increase the WCD's buffer-fullness threshold.

In practice, for instance, the eNodeB may decide based at least on the predicted duration that the eNodeB should increase the buffer-fullness threshold. Further, the eNodeB may decide based at least in part on predicted duration an extent to which the eNodeB should increase the buffer-fullness threshold. And the eNodeB may then accordingly increase the buffer-fullness threshold, thereby helping to defer reaching the threshold and thus possibly helping to defer increasing of the air interface resources (e.g., number of carriers) used for serving the WCD.

By way of example, the eNodeB may determine whether the predicted duration is less than a predefined threshold duration indicating that the WCD's buffer will soon reach the fullness threshold, and the eNodeB may therefore decide to increase the WCD's buffer-fullness threshold. (Whereas, if the eNodeB determines that the predicted duration is greater than the predefined threshold duration, then the eNodeB may decide to not increase the WCD's buffer-fullness threshold.) Further, the extent of increase of the WCD's buffer-fullness threshold could be inversely proportional to the predicted duration T, so that, the shorter the predicted duration, the more the eNodeB may decide to increase the WCD's buffer-fullness threshold.

In this process the eNodeB may also take into consideration one or more additional factors as a basis to decide whether and, if so, to what extent to increase the WCD's buffer-fullness threshold. For example, the eNodeB may take into consideration the type of data the that will be communicated, such as the type of content (represented by the data) that will be communicated to the WCD. To do so, the eNodeB could consider the QCI level of the bearer on which data is arriving for transmission to the WCD as an indication of the type of content being communicated or about to be communicated, or the eNodeB could engage in deep packet inspection to determine the type of content being communicated or about to be communicated. And the eNodeB could then weigh its decision accordingly.

For instance, if the eNodeB detects that the type of content that will be communicated is more latency-sensitive, then the eNodeB could weigh its decision against increasing the buffer-fullness threshold or in favor of increasing the buffer-fullness threshold less than for best-efforts data traffic. By not increasing the buffer-fullness threshold for more latency-sensitive data traffic or increasing the buffer-fullness threshold less for more latency-sensitive data traffic, the eNodeB may then be more likely to soon increase air interface resources used to serve the WCD, which may help avoid delays in handling that more latency-sensitive data traffic.

On the other hand, if the eNodeB detects that the type of content that will be communicated is less latency-sensitive, such as best-efforts traffic, then the eNodeB could weigh its decision in favor of increasing the buffer-fullness threshold. By then increasing the buffer-fullness threshold more for less latency-sensitive data traffic (e.g., for more best-efforts traffic), the eNodeB may then be more likely to buffer (and thus delay transmission of) additional such data traffic rather than to add additional air interface resources on which to transmit the data traffic.

To do this in practice, the eNodeB may maintain (e.g., include or otherwise have access to) a set of correlation data that correlates various buffer-fullness-threshold adjustments with respective combinations of duration T and type of content. For instance, the correlation data could be a predefined table that relates duration T to type of content and specifies for each such combination a particular adjustment to make to the buffer-fullness threshold. Each such adjustment could be a percentage or other adjustment as an extent of increase of the buffer-fullness threshold or could be the new buffer-fullness threshold value to use. For certain such combinations, the adjustment might be zero (indicating no increase), and for others, the adjustment might be a specific extent of adjustment in line with this process. Thus, the eNodeB may refer to the correlation data to determine the buffer-fullness-threshold adjustment based on the predicted duration T and the type of content, and the eNodeB may then increase the buffer-fullness threshold in accordance with the determined buffer-fullness-threshold adjustment.

Figure 2:
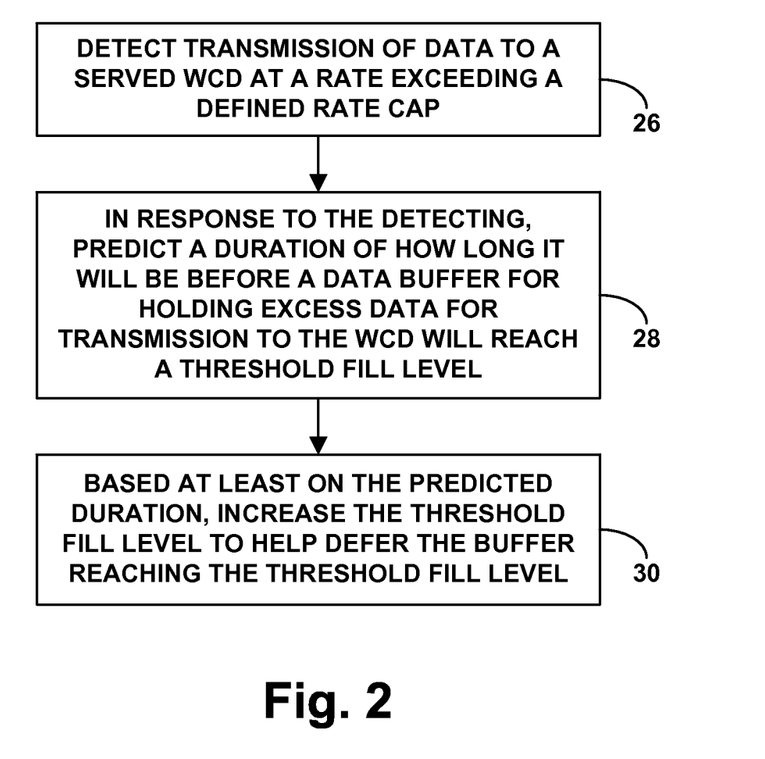
FIG. 2 is a flow chart depicting example operations in accordance with the disclosure.

FIG. 2 is next a flow chart depicting in summary a method that may be carried out by a representative base station and/or one or more other network entities (e.g., an SGW, PGW, or other entity in the data transmission path), to help manage data buffering. As shown in FIG. 2, at block 26, the method involves detecting transmission of data to a served WCD at a rate exceeding a defined rate cap. At block 28, the method then involves, in response to that detecting, predicting a duration T of how long it will be before a data buffer for holding excess data for transmission to the WCD will reach a threshold fill level. And at block 30, the method involves, based at least on the predicted duration T, increasing the threshold fill level to help defer the buffer reaching the threshold fill level. As discussed above, the base station in this process may be configured to respond to the buffer reaching the threshold fill level by increasing air interface resources used for serving the WCD (e.g., adding one or more carriers to a radio-link-layer connection through which the base station serves the WCD). Consequently, increasing the threshold fill level may help to defer increasing air interface resources used for serving the WCD.

In line with the discussion above, the act of predicting the duration T of how long it will be before the data buffer for holding excess data for transmission to the WCD will reach the threshold fill level in this process may involve computing the duration T based on a ratio of (i) the threshold fill level to (ii) a difference between actual rate of data transmission to the WCD and the data rate cap. Further, the process may further include determining a type of content that will be communicated between the base station and the WCD, in which case increasing the threshold fill level based at least on the predicted duration T may involve increasing the threshold fill level based at least in part on the predicted duration T and the determined type of content.

Figure 3:
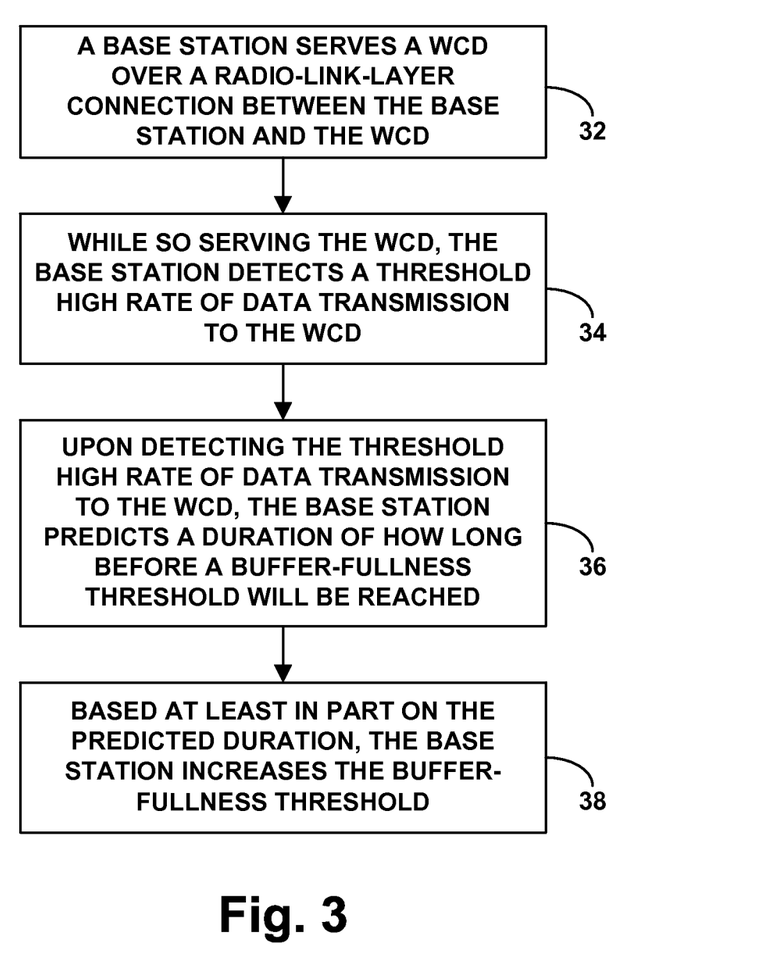
FIG. 3 is another flow chart depicting example operations in accordance with the disclosure.

FIG. 3 is next another flow chart depicting an alternative embodiment of the method, again as may be carried out by a representative base station, to help manage data buffering. As shown in FIG. 3, at block 32, the method involves the base station serving a WCD over a radio-link-layer connection between the base station and the WCD, where the radio-link-layer connection has a capacity (e.g., just one carrier, or some other limited quantity of carriers or otherwise of air interface resources for carrying data). And at block 34, the method involves, while so serving the WCD, the base station detecting a threshold high rate of data transmission to the WCD, where the base station is configured to buffer, in a data buffer, excess data for transmission to the WCD upon the reaching the threshold high rate of data transmission to the WCD, where the data buffer has a fullness-threshold, and where the base station is configured to increase the capacity of the radio-link-layer connection upon the data buffer reaching the fullness threshold. At block 36, the method then involves, upon detecting the threshold high rate of data transmission to the WCD, the base station predicting a duration T of how long before the buffer-fullness threshold will be reached. And at block 38, the method involves, based at least in part on the predicted duration T, the base station increasing the buffer-fullness threshold.

In line with the discussion above, the act of detecting the threshold high rate of data transmission to the WCD in this process could involve detecting that a current rate of data transmission to the WCD is higher than a data rate cap, possibly determining the current rate of data transmission to the WCD based on an observation of data transmission rate over a period of time, such as a recent trend of data transmission rate for instance. Likewise, the act of detecting the threshold high rate of data transmission to the WCD could involve predicting, based on recent data transmission to the WCD, that the rate of data transmission to the WCD will be higher than a data rate cap.

Figure 4:
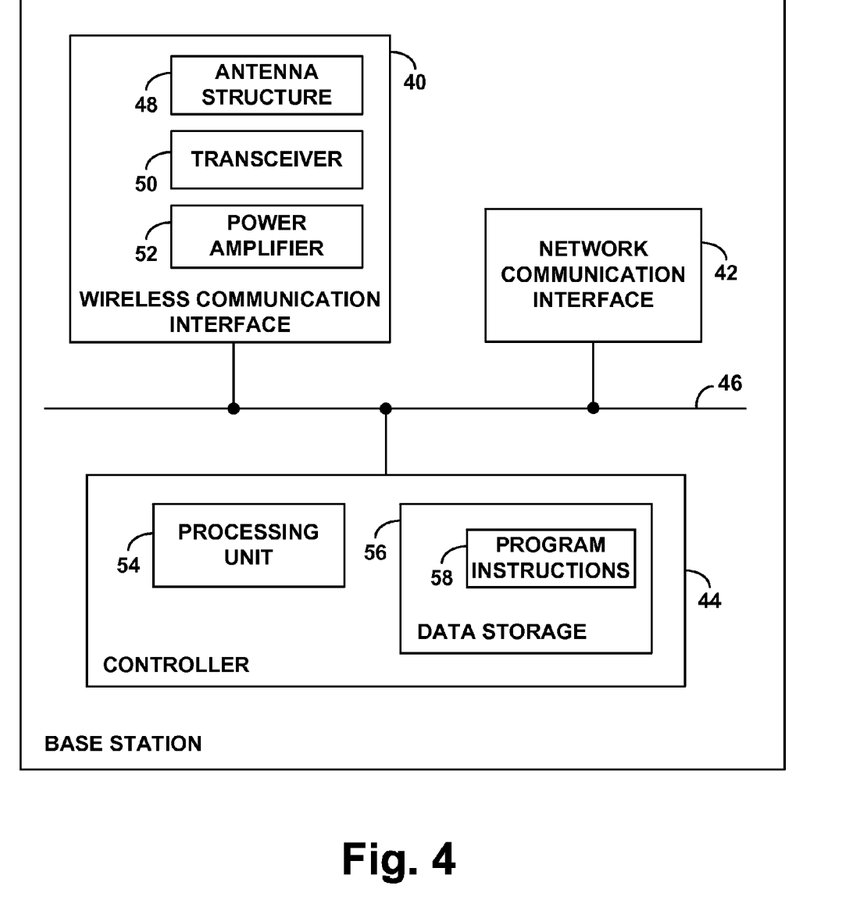
FIG. 4 is a simplified block diagram of an example base station operable in accordance with the disclosure.

Finally, FIG. 4 is a simplified block diagram of a base station (e.g., macro eNodeB, small cell, or other type of base station), showing some of the components that such an entity may include in order to carry out these and other operations. As shown, the example base station includes a wireless communication interface 40, a network communication interface 42, and a controller 44, all of which could be integrated together in various ways or, as shown, interconnected with each other through a system bus, network, or other connection mechanism 46.

Wireless communication interface 40 includes an antenna structure (e.g., one or more antennas or antenna elements) 48, which could be tower mounted or provided in some other manner, configured to transmit and receive over the air interface and thereby facilitate communication with served WCDs. Further, the wireless communication interface includes a transceiver 50 and power amplifier 52 supporting air interface communication according to the LTE protocol. Network communication interface 42 may then comprise one or more wired and/or wireless network interfaces (such as an Ethernet interface) through which the base station may receive data over a backhaul connection with SGW 20 as discussed above.

Controller 44, which may be integrated with wireless communication interface 40 or with one or more other components of the eNodeB, may then be configured to manage communication over the air interface, including managing buffering of data in accordance with the present disclosure. By way of example, controller 44 is shown including a processing unit (e.g., one or more microprocessors or other processors) 54, data storage (e.g., one or more volatile and/or non-volatile non-transitory storage components, such as magnetic, optical, and/or flash storage) 56, and program instructions 58 stored in the data storage 56, executable by the processing unit 54 to carry out various disclosed base station operations.

By way of example, controller 44 may be configured to (a) detect that a rate of data transmission to the WCD via the wireless communication interface exceeds a defined rate cap, and (b) in response to detecting that the rate of data transmission to the WCD exceeds the defined rate cap, (i) predicting a duration T of how long it will be before a data buffer for holding excess data for transmission to the WCD will reach a threshold fill level at which the base station would increase air interface resources used for serving the WCD, and (ii) based at least on the predicted duration T, increasing the threshold fill level to help defer the buffer reaching the threshold fill level and thus to help defer increasing air interface resources used for serving the WCD. Further, the controller may be configured to determine a type of content that will be communicated to the WCD, in which case increasing the threshold fill level based at least on the predicted duration T may involve increasing the threshold fill level based at least in part on the predicted duration T and the determined type of content.

Exemplary embodiments have been described above. Those skilled in the art will understand, however, that changes and modifications may be made to these embodiments without departing from the true scope and spirit of the invention.

What is claimed is:

1. A method of managing data buffering in a wireless communication system, wherein the wireless communication system comprises a base station, the method comprising:
    detecting transmission of data to a served wireless communication device (WCD) at a rate exceeding a defined rate cap;
        in response to the detecting, predicting a duration T of how long it will be before a data buffer for holding excess data for transmission to the WCD will reach a threshold fill level; and
    based at least on the predicted duration T, increasing the threshold fill level to help defer the buffer reaching the threshold fill level, wherein increasing the buffer-fullness threshold based at least in part on the predicted duration T comprises increasing the buffer-fullness threshold by an extent that is inversely proportional to the predicted duration T,
    wherein the base station is configured to respond to the buffer reaching the threshold fill level by increasing air interface resources used for serving the WCD, whereby increasing the threshold fill level thus helps defer increasing air interface resources used for serving the WCD.

2. The method of claim 1, wherein predicting the duration T of how long it will be before the data buffer for holding excess data for transmission to the WCD will reach the threshold fill level comprises computing the duration T based on a ratio of (i) the threshold fill level to (ii) a difference between actual rate of data transmission to the WCD and the data rate cap.

3. The method of claim 1, further comprising determining a type of content that will be communicated between the base station and the WCD, wherein increasing the threshold fill level based at least on the predicted duration T comprises increasing the threshold fill level based at least in part on the predicted duration T and the determined type of content.

4. The method of claim 1, wherein increasing the air interface resources used for serving the WCD comprises adding one or more radio frequency carriers to a radio-link-layer connection through which the base station serves the WCD.

5. The base station of claim 1, wherein increasing the air interface resources used for serving the WCD comprises adding one or more radio frequency carriers to a radio-link-layer connection through which the base station serves the WCD.

6. A method of managing data buffering in a wireless communication system, wherein the wireless communication system comprises a base station, the method comprising:
    serving by the base station a wireless communication device (WCD) over a radio-link-layer connection between the base station and the WCD, wherein the radio-link-layer connection has a capacity;
    while so serving the WCD, detecting by the base station a threshold high rate of data transmission to the WCD, wherein the base station is configured to buffer, in a data buffer, excess data for transmission to the WCD upon the reaching the threshold high rate of data transmission to the WCD, wherein the data buffer has a fullness-threshold, and wherein the base station is configured to increase the capacity of the radio-link-layer connection upon the data buffer reaching the fullness threshold;
    upon detecting the threshold high rate of data transmission to the WCD, predicting by the base station a duration T of how long before the buffer-fullness threshold will be reached; and
    based at least in part on the predicted duration T, increasing by the base station the buffer-fullness threshold, wherein increasing the buffer-fullness threshold based at least in part on the predicted duration T comprises increasing the buffer-fullness threshold by an extent that is inversely proportional to the predicted duration T, whereby increasing the buffer-fullness threshold helps to defer possible increasing of capacity of the radio-link-layer connection.

7. The method of claim 6, wherein detecting the threshold high rate of data transmission to the WCD comprises detecting that a current rate of data transmission to the WCD is higher than a data rate cap.

8. The method of claim 7, further comprising determining the current rate of data transmission to the WCD based on an observation of data transmission rate over a period of time.

9. The method of claim 6, wherein detecting the threshold high rate of data transmission to the WCD comprises predicting, based on recent data transmission to the WCD, that the rate of data transmission to the WCD will be higher than a data rate cap.

10. The method of claim 6, wherein the capacity of the radio-link-layer connection is defined at least in part by how many carriers the radio-link-layer connection encompasses, and wherein increasing the capacity of the radio-link-layer connection comprises increasing a number of carriers encompassed by the radio-link-layer connection.

11. The method of claim 10, wherein the radio-link-layer connection initially encompasses just one carrier, and wherein increasing the capacity of the radio-link-layer connection comprises adding at least one carrier to the radio-link-layer connection, to provide the WCD with carrier aggregation service.

12. The method of claim 6, wherein predicting the duration T of how long before the buffer-fullness threshold will be reached comprises computing the duration T based on a ratio of (i) the buffer-fullness threshold to (ii) a difference between actual rate of data transmission to the WCD and a data rate cap.

13. The method of claim 12, wherein predicting the duration T of how long before the buffer-fullness threshold will be reached comprises computing $T=C/(\beta_t-\gamma)+\epsilon$, wherein C is the buffer-fullness threshold, $\beta_t$ is the actual rate of data transmission to the WCD, $\gamma$ is the data rate cap, and $\epsilon$ is an error factor.

14. The method of claim 6, wherein increasing the buffer-fullness threshold based at least in part on the predicted duration T comprises:
    determining a buffer-fullness-threshold adjustment based on the predicted duration T; and
    increasing the buffer-fullness threshold in accordance with the determined buffer-fullness-threshold adjustment.

15. The method of claim 14, wherein the buffer-fullness-threshold adjustment is selected from the group consisting of (i) an extent of increase of the buffer-fullness threshold and (ii) an increased buffer-fullness threshold.

16. The method of claim 6, further comprising determining a type of content that will be communicated between the base station and the WCD, wherein increasing the buffer-fullness threshold based at least in part on the predicted duration T comprises increasing the buffer-fullness threshold based at least in part on the predicted duration T and the determined type of content.

17. The method of claim 16, further comprising maintaining correlation data that correlates various buffer-fullness-threshold adjustments with respective combinations of duration T and type of content, wherein increasing the buffer-fullness threshold based at least in part on the predicted duration T comprises:
    referring to the correlation data to determine the buffer-fullness-threshold adjustment based on the predicted duration T and the type of content; and
    increasing the buffer-fullness threshold in accordance with the determined buffer-fullness-threshold adjustment.

18. A base station configured to manage data buffering, wherein the base station comprises:
    a wireless communication interface for communicating over an air interface with a served wireless communication devices (WCD);
    a processing unit;
    data storage; and
    program instructions stored in the data storage and executable by the processing unit to carry out operations comprising:
    detecting that a rate of data transmission to the WCD exceeds a defined rate cap, and
    in response to detecting that the rate of data transmission to the WCD exceeds the defined rate cap, (i) predicting a duration T of how long it will be before a data buffer for holding excess data for transmission to the WCD will reach a threshold fill level at which the base station would increase air interface resources used for serving the WCD, and (ii) based at least on the predicted duration T, increasing the threshold fill level to help defer the buffer reaching the threshold fill level and thus to help defer increasing air interface resources used for serving the WCD,
    wherein increasing the buffer-fullness threshold based at least in part on the predicted duration T comprises increasing the buffer-fullness threshold by an extent that is inversely proportional to the predicted duration T.

19. The base station of claim 18, wherein the operations further comprise determining a type of content that will be communicated to the WCD, wherein increasing the threshold fill level based at least on the predicted duration T comprises increasing the threshold fill level based at least in part on the predicted duration T and the determined type of content.

* * * * *